US011755529B2

(12) United States Patent
Aksionkin et al.

(10) Patent No.: US 11,755,529 B2
(45) Date of Patent: *Sep. 12, 2023

(54) COMPLIANCE VIOLATION DETECTION

(71) Applicant: c/o Microsoft Technology Licensing, LLC, Redmond, WA (US)

(72) Inventors: Michael Aksionkin, Kirkland, WA (US); Boris Asipov, Bellevue, WA (US); Saikat Guha, Bangalore (IN); Leena Jain Sheth, Bothell, WA (US); Rithesh Baradi, Redmond, WA (US); Alisson Sol, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/324,429

(22) Filed: May 19, 2021

(65) Prior Publication Data
US 2021/0271633 A1 Sep. 2, 2021

Related U.S. Application Data

(63) Continuation of application No. 15/214,985, filed on Jul. 20, 2016, now Pat. No. 11,042,506.

(51) Int. Cl.
*G06F 16/00* (2019.01)
*G06F 16/11* (2019.01)
*G06F 16/21* (2019.01)
*G06F 16/23* (2019.01)
*H04L 9/40* (2022.01)

(52) U.S. Cl.
CPC .......... *G06F 16/125* (2019.01); *G06F 16/211* (2019.01); *G06F 16/2365* (2019.01); *H04L 63/20* (2013.01)

(58) Field of Classification Search
None
See application file for complete search history.

(56) References Cited

U.S. PATENT DOCUMENTS 7,996,373 B1 * 8/2011 Zoppas ................. G06F 21/554
707/694
8,082,337 B1 * 12/2011 Davis .................. H04L 41/0893
709/223

(Continued)

OTHER PUBLICATIONS

"Second Office Action Issued in Chinese Patent Application No. 201780044956.3", dated Jun. 3, 2021, 20 Pages.

*Primary Examiner* — Hasanul Mobin
(74) *Attorney, Agent, or Firm* — RAY QUINNEY & NEBEKER P.C.; Paul N. Taylor

(57) ABSTRACT

Non-limiting examples of the present disclosure describe systems and methods for scanning of data for policy compliance. In one example, network data is evaluated to generate one or more groupings. A grouping may be based on file type of the network data. Data identification rules are applied to identify one or more data schemas from file data of a grouping. One or more policy rules that apply to content of the data schema may be determined. At least one file of the file data may be scanned to determine compliance with the one or more policy rules. A report of compliance with the one or more policy rules may be generated based on a result of a file scan. Other examples are also described.

8 Claims, 7 Drawing Sheets

(56) References Cited

U.S. PATENT DOCUMENTS

| | | | | |
|---|---|---|---|---|
| 8,863,279 B2* | 10/2014 | McDougal | .......... | H04L 63/1416 |
| | | | | 726/22 |
| 2002/0057297 A1* | 5/2002 | Grimes | ............... | G06F 16/9577 |
| | | | | 715/810 |
| 2002/0143659 A1* | 10/2002 | Keezer | ................ | G06Q 30/0641 |
| | | | | 707/E17.116 |
| 2005/0209876 A1* | 9/2005 | Kennis | ............. | G06Q 10/06311 |
| | | | | 726/1 |
| 2007/0143827 A1* | 6/2007 | Nicodemus | ......... | G06F 21/6218 |
| | | | | 726/2 |
| 2010/0306283 A1* | 12/2010 | Johnson | ................ | G06F 16/125 |
| | | | | 707/803 |
| 2013/0185804 A1* | 7/2013 | Biswas | ................ | G06F 21/577 |
| | | | | 726/26 |
| 2013/0238641 A1* | 9/2013 | Mandelstein | ......... | G06F 16/211 |
| | | | | 707/756 |
| 2013/0263206 A1* | 10/2013 | Nefedov | ............. | G06F 21/6245 |
| | | | | 726/1 |
| 2015/0261768 A1* | 9/2015 | Ahn | ........................ | H04L 51/12 |
| | | | | 707/665 |
| 2015/0356094 A1* | 12/2015 | Gorelik | ................ | G06F 16/211 |
| | | | | 707/748 |
| 2016/0078068 A1* | 3/2016 | Agrawal | ............... | G06F 16/215 |
| | | | | 707/692 |
| 2017/0046421 A1* | 2/2017 | Cao | ........................ | G06F 16/211 |

* cited by examiner

400

COMPLIANCE VIOLATION DETECTION

CROSS-REFERENCE TO RELATED APPLICATIONS

This application is a continuation of U.S. patent application Ser. No. 15/214,985, filed Jul. 20, 2016, which is hereby incorporated by reference in its entirety.

BACKGROUND

Data within large organizations may be stored in multiple services, across multiple geographies, and subject to multiple regulations. Most technologies for data storage guarantee integrity, protect against unauthorized access, but won't enforce legal regulations or business rules. There are business rules that prevent the flow of data across certain boundaries, like European Union regulations that prohibit the copy of "personal data" beyond certain boundaries. There are also laws and business rules for data at rest, for example, requirements to delete personal data identifying logged on users to an online service after a period of time (for example, 18 months). However, it is uncommon to find data stores that will automatically identify potential policy violations and enforce an expiration data (based on flexible business rules). Further, it is difficult to audit large data stores that may store various types of information that may be subject to different policies in order to verify compliance with such policies.

As such, examples of the present application are directed to the general technical environment related to detection and management of compliance violations related to data that is either stored or being processed in real-time, among other examples.

SUMMARY

Non-limiting examples of the present disclosure describe systems and methods for scanning data for policy compliance purposes. In one example, network data is recursively discovered. Network data may comprise any of: data stored in one or more data stores of a distributed network, data received at a firewall, data stored on a client computing device, and data from an application executing on the client computing device. The network data is evaluated to generate one or more groupings. A grouping may be based on file type of the network data. Data identification rules are applied to identify one or more data schemas from file data of a grouping. In some examples, application of data identification rules may comprise: determining a position of a data schema in file data of a grouping and generating a confidence score for identification of the data schema based on pattern matching that evaluates content of the position in the file data using one or more signals. One or more policy rules that apply to content of the data schema may be determined. At least one file of the file data may be scanned to determine compliance with the one or more policy rules. In some examples, the scanning may only have to scan a portion of a file that corresponds with a position of a data schema to which a policy rule applies. In one example, a most recent file from the file data of a grouping may be scanned to determine compliance with the policy rules. In further examples, at least one other file of the grouping may be scanned, for example, a file that has a date exceeding a time period of a retention policy of a policy rule. A report of compliance with the one or more policy rules may be generated based on a result of a file scan. In further examples, an action may be executed to remediate a compliance violation identified in the report. An executed action may comprise one or more of: requesting a data owner of a file to remedy the compliance violation, scrubbing a file to remedy a compliance violation, and deleting a file that includes the compliance violation, among other examples.

In other non-limiting examples, portions of file data may be scanned to determine compliance with policy rules. In one example, network data is evaluated to generate one or more groupings. A grouping may be based on file type of the network data. Data identification rules are applied to identify data schemas from file data of a grouping. Application of the data identification rules may comprise: determining a position of a data schema in file data of a grouping and generating a confidence score for identification of the data schema based on pattern matching that evaluates content of the position in the file data using one or more signals. One or more policy rules that apply to content of the data schema may be determined. File data may be scanned to determine whether a policy violation exists. In one example, a portion of file data that corresponds with the position of the data schema(s) may be scanned. In other examples, multiple files may be scanned for the detection of compliance violations. For instance, a portion of a most recent file of a grouping may be scanned. Additionally, at least one other file of the grouping may be scanned, for example, a file that has a date exceeding a time period of a retention policy of a policy rule.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
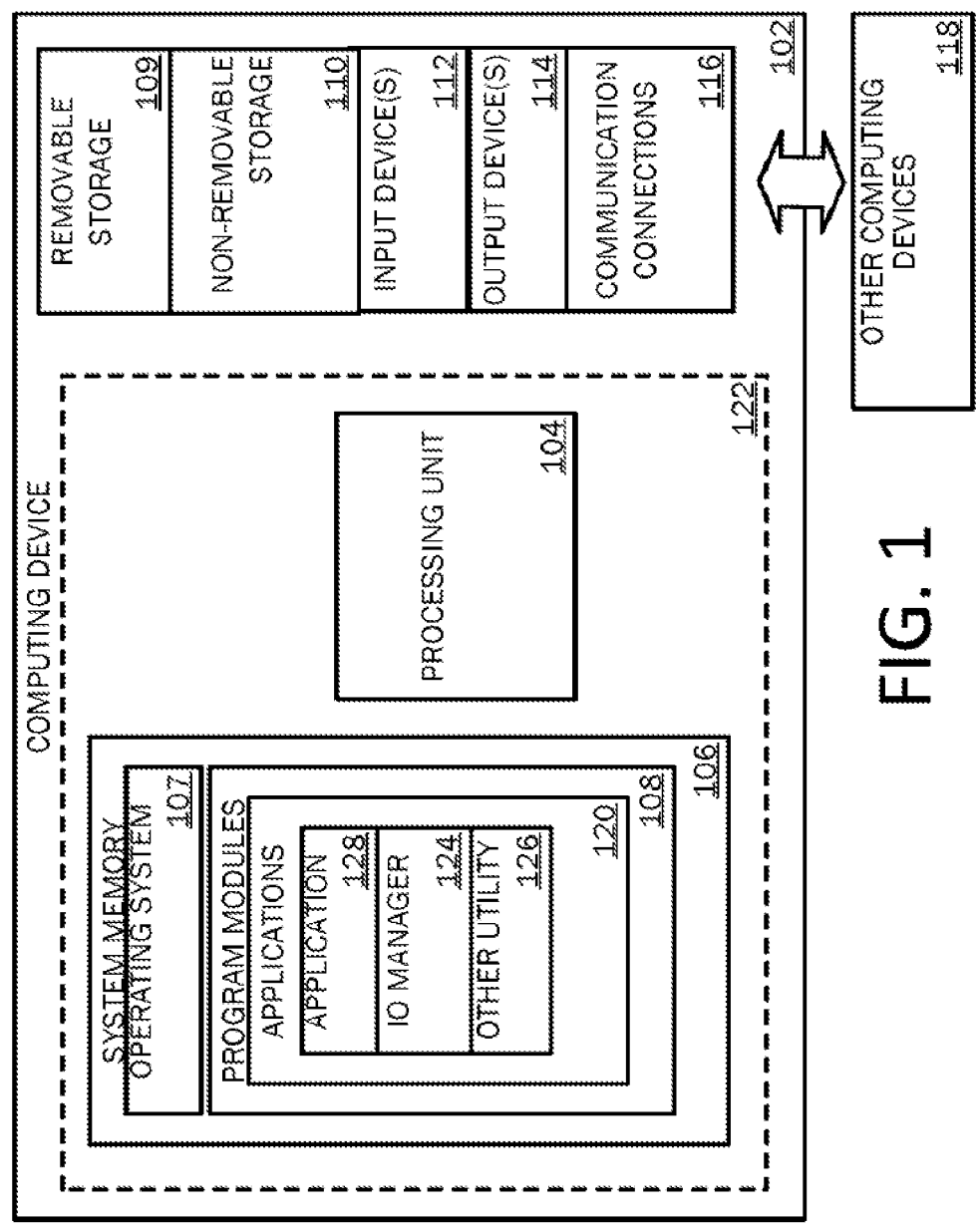
FIG. 1 is a block diagram illustrating an example of a computing device with which aspects of the present disclosure may be practiced.

Examples herein describe scanning of data to verify compliance with policy rules. A policy rule may be any type of rule that may be applicable to data and/or content within a data file. Policy rules may comprise but not limited to:

business rules, privacy rules, governmental regulation rules, and legal rules, among other examples. As identified above, it is uncommon to find data store that will automatically identify potential policy violations and enforce an expiration data (based on flexible business rules). Further, it is difficult to audit large data stores that may store various types of information that may be subject to different policies in order to verify compliance with such policies. Examples herein efficiently scan network data to identify compliance violations within the network data. Exemplary network data may be recursively discovered. Network data may comprise any of: data stored in one or more data stores of a distributed network, data received at a firewall, data stored on a client computing device, and data from an application executing on the client computing device. The network data is evaluated to generate one or more groupings. A grouping may be based on file type of the network data. To improve efficiency in scanning of network data (e.g. minimize the amount of data being read during scanning), the network data may be grouped to identify data that includes similar content. In one example, data may be grouped based on file type. For instance, a naming convention of a file or the file format may be used to group files. However, one skilled in the art that understands the present disclosure should recognize that grouping of file data is not limited to grouping of network data by only file type. Other factors may be applicable when grouping data including but not limited to: file name, file size, layout of a file, content within a file, date, file location, and user accounts associated with the file, among other examples.

In addition to grouping of similar data, efficiency in scanning of data can be further improved by identifying, before scanning for compliance, data schemas of specific network data. A data schema as defined herein may relate to a definition of a structure within a file of network data. A file may comprise a plurality of data schemas. Identification of data schemas within a file (of network data) assists in better identifying types of data within a file in order to more efficiently and accurately determine applicable policy rules. Consider an example where a spreadsheet file is stored where the spreadsheet file includes a plurality of columns and rows of information. An exemplary data schema may be a portion of the file (e.g. column 1/row 1 of the spreadsheet) that stores a first type of data (e.g., a name). That same spreadsheet may include another data schema (e.g., column 2/row 2) that stores a second type of data (e.g. an Internet Protocol (IP) address). Continuing this example, the spreadsheet may include yet another data schema (e.g. column 3/row 3) that stores a markup language object such as a JavaScript Object Notation (JSON) object. In such a case, the JSON object may be nested and comprise multiple fields or properties. Such information may be identified by an exemplary data schema. Examples described herein apply processing operations that identify different data schemas of file data (e.g. a sampling of columns) so that a determination can be made as to policy rules that apply to specific data schemas. Processing operations can then be applied to verify a derived type of data (from the data schemas). In examples, patterns related to data schemas (and content within data schemas) can be analyzed to confirm data schemas within a file. Alternative solutions may rely on metadata of a file to for data identification. However, relying on only metadata for file data identification can create a lot of false positives when it comes to data identification as metadata is continuously changed. This may ultimately lead to less efficiency during scanning and less accuracy in compliance identification, among other examples. As such, it is beneficial to validate data schemas within a file before executing scanning operations. Once network data is grouped and data schemas of specific network data are validated, further processing operations may be applied to determine policy rules that are applicable to specific data schemas within a file.

In addition to exemplary practices for grouping of network data and identification of specific data schemas within a file, scanning of file data can be optimized when attempting to determine compliance with exemplary policy rules. Examples described herein optimize scanning by minimizing the amount of data being read during a scan. Not all files of network data (or even all files in a group) need to be scanned to identify patterns of compliance violations. By grouping files, samples of file data from a grouping can be scanned. In one example, a most recent file from the file data of a grouping may be scanned to determine compliance with the policy rules. In further examples, at least one other file of the grouping may be scanned, for example, a file that has a date exceeding a time period of a retention policy of a policy rule. In some examples, the scanning may only have to scan a portion of a file that corresponds with a position of a data schema to which a policy rule applies. As such, a small number of files (or portions of files) can be scanned to identify compliance violations. Subsequent files may be scanned if compliance issues are identified in a sampling of files that are scanned. However, one skilled in the art that understands the present disclosure should recognize that sampling of files, patterns for scanning (including enabling full scans of network data) may vary according to developers and/or users of a scanning service.

Accordingly, the present disclosure provides a plurality of technical advantages including but not limited to: improved organization and grouping of network data for policy compliance identification, pattern matching for validating data schemas within specific network data, improved systems and methods for scanning of network data for compliance with policy rules, more efficient operation of processing devices (e.g., saving computing cycles/computing resources) during scanning network data for compliance with policy rules, ability to sample network data when executing scanning operations, and extensibility to integrate scanning service across components of a distributed system as well as at a device level or application level, among other examples.

Figure 2A:
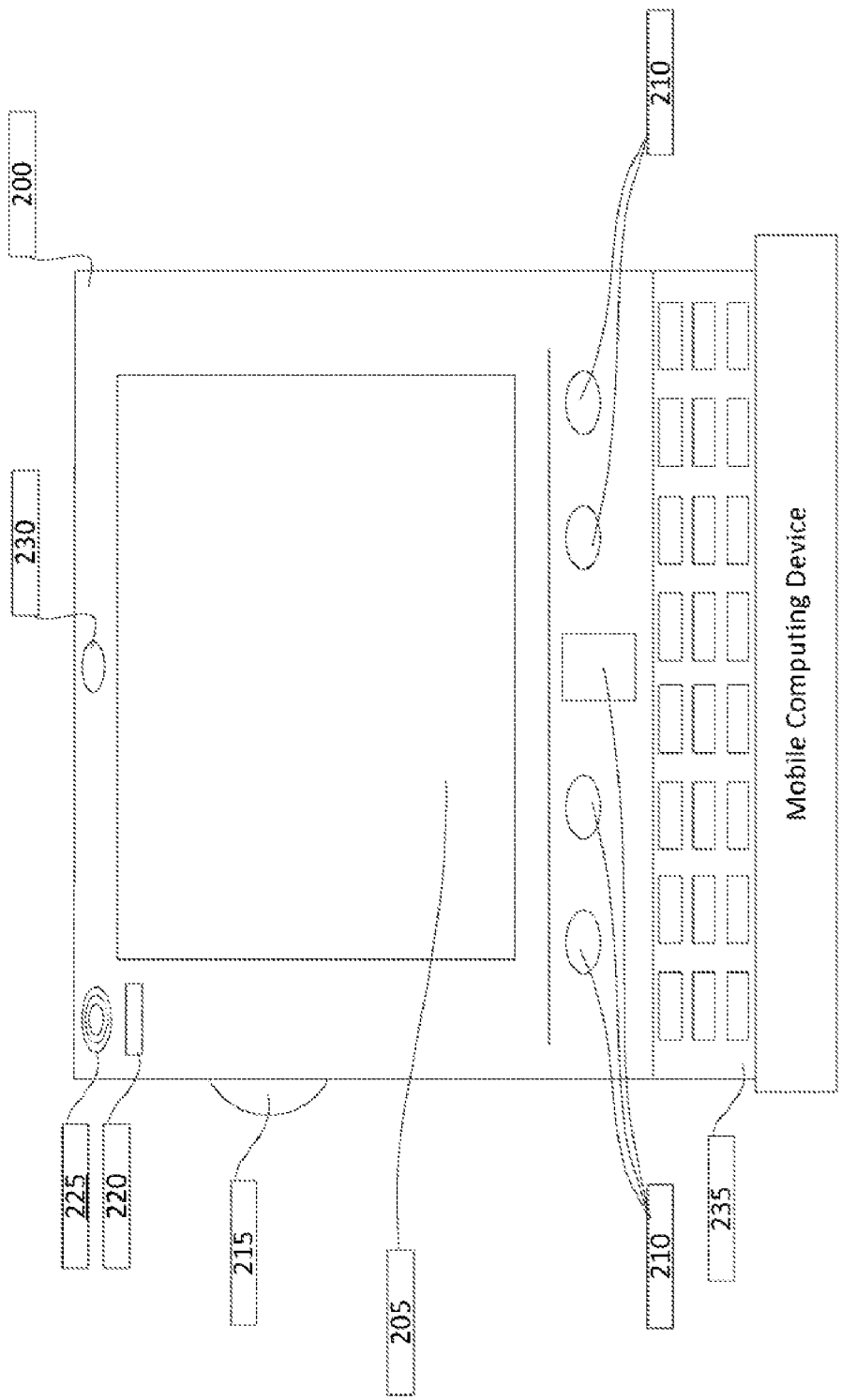
FIGS. 2A and 2B are simplified block diagrams of a mobile computing device with which aspects of the present disclosure may be practiced.
Figure 2B:
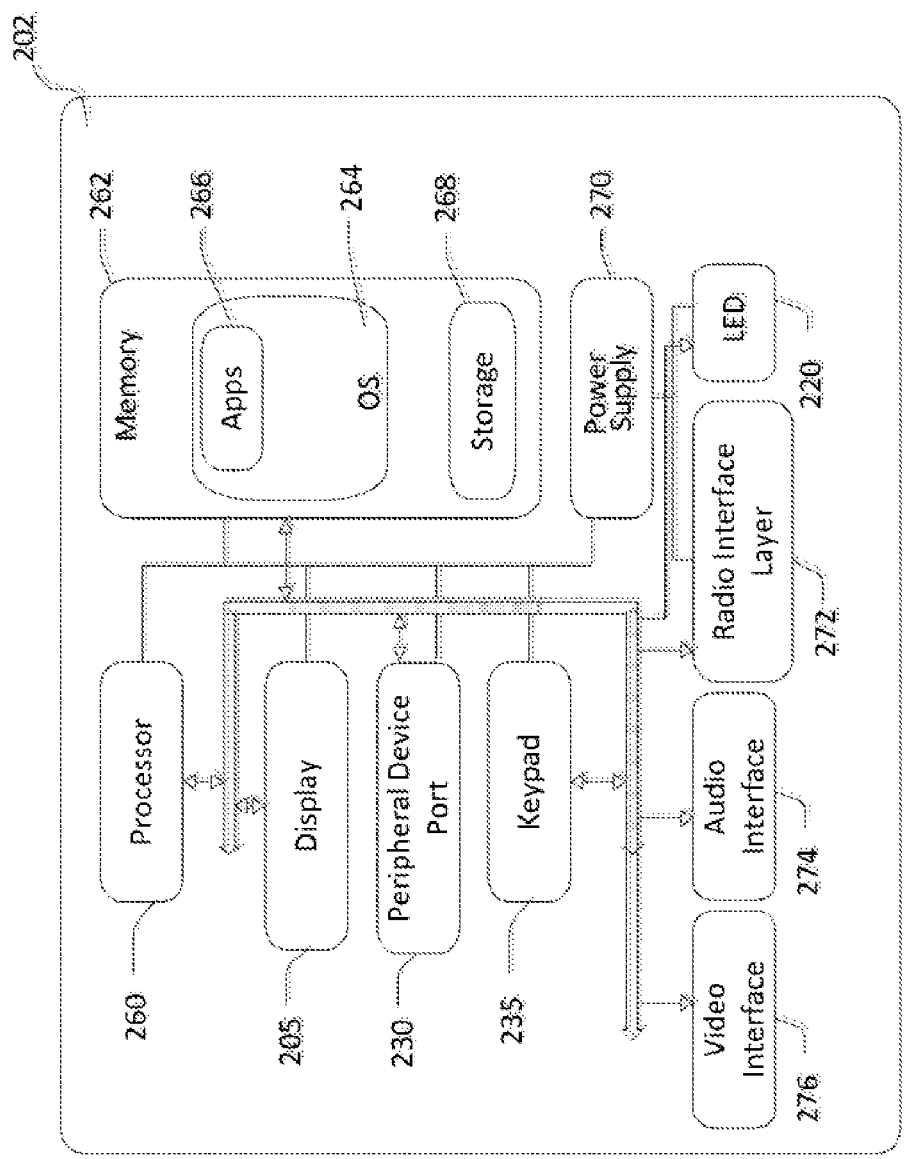
Figure 3:
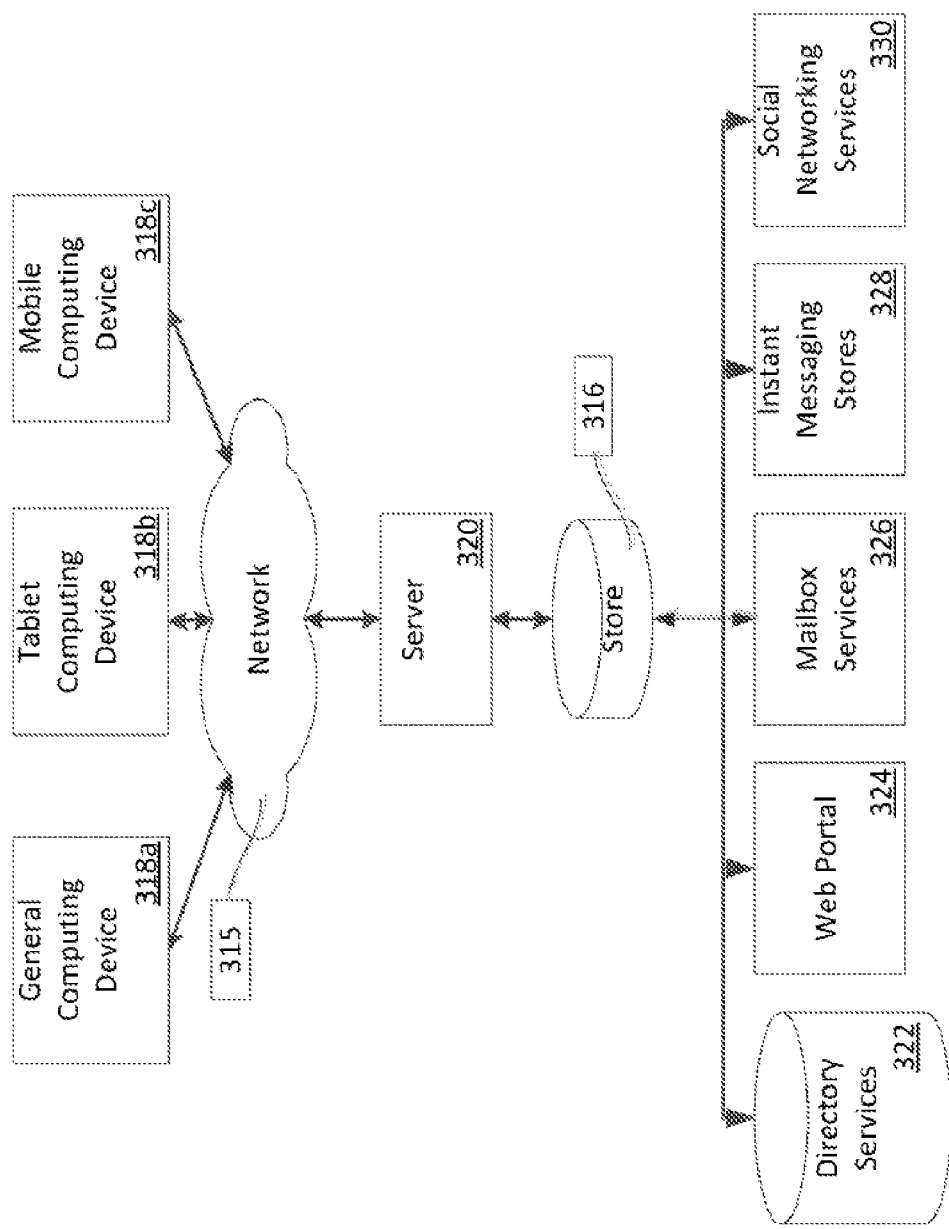
FIG. 3 is a simplified block diagram of a distributed computing system in which aspects of the present disclosure may be practiced.

FIGS. 1-3 and the associated descriptions provide a discussion of a variety of operating environments in which examples of the invention may be practiced. However, the devices and systems illustrated and discussed with respect to FIGS. 1-3 are for purposes of example and illustration and are not limiting of a vast number of computing device configurations that may be utilized for practicing examples of the invention, described herein.

FIG. 1 is a block diagram illustrating physical components of a computing device 102, for example a mobile processing device, with which examples of the present disclosure may be practiced. For example, computing device 102 may be an exemplary computing device configured for implementing operations for compliance scanning as described in examples herein. In a basic configuration, the computing device 102 may include at least one processing unit 104 and a system memory 106. Depending on the configuration and type of computing device, the system memory 106 may comprise, but is not limited to, volatile storage (e.g., random access memory), non-volatile storage (e.g., read-only memory), flash memory, or any combination of such memories. The system memory 106 may include an operating system 107 and one or more program modules 108 suitable for running software programs/modules 120 such as IO manager 124, other utility 126 and application 128. As examples, system memory 106 may store instructions for execution. Other examples of system memory 106 may store data associated with applications. The operating system 107, for example, may be suitable for controlling the operation of the computing device 102. Furthermore, examples of the invention may be practiced in conjunction with a graphics library, other operating systems, or any other application program and is not limited to any particular application or system. This basic configuration is illustrated in FIG. 1 by those components within a dashed line 122. The computing device 102 may have additional features or functionality. For example, the computing device 102 may also include additional data storage devices (removable and/or non-removable) such as, for example, magnetic disks, optical disks, or tape. Such additional storage is illustrated in FIG. 1 by a removable storage device 109 and a non-removable storage device 110.

As stated above, a number of program modules and data files may be stored in the system memory 106. While executing on the processing unit 104, program modules 108 (e.g., Input/Output (I/O) manager 124, other utility 126 and application 128) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 102 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 102 may also have one or more input device(s) 112 such as a keyboard, a mouse, a pen, a sound input device, a device for voice input/recognition, a touch input device, etc. The output device(s) 114 such as a display, speakers, a printer, etc. may also be included. The aforementioned devices are examples and others may be used. The computing device 102 may include one or more communication connections 116 allowing communications with other computing devices 118. Examples of suitable communication connections 116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 106, the removable storage device 109, and the non-removable storage device 110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 102. Any such computer storage media may be part of the computing device 102. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 2A and 2B illustrate a mobile computing device 200, for example, a mobile telephone, a smart phone, a personal data assistant, a tablet personal computer, a phablet, a slate, a laptop computer, and the like, with which examples of the invention may be practiced. Mobile computing device 200 may be an exemplary computing device configured for implementing operations for compliance scanning as described in examples herein. With reference to FIG. 2A, one example of a mobile computing device 200 for implementing the examples is illustrated. In a basic configuration, the mobile computing device 200 is a handheld computer having both input elements and output elements. The mobile computing device 200 typically includes a display 205 and one or more input buttons 210 that allow the user to enter information into the mobile computing device 200. The display 205 of the mobile computing device 200 may also function as an input device (e.g., a touch screen display). If included, an optional side input element 215 allows further user input. The side input element 215 may be a rotary switch, a button, or any other type of manual input element. In alternative examples, mobile computing device 200 may incorporate more or less input elements. For example, the display 205 may not be a touch screen in some examples. In yet another alternative example, the mobile computing device 200 is a portable phone system, such as a cellular phone. The mobile computing device 200 may also include an optional keypad 235. Optional keypad 235 may be a physical keypad or a "soft" keypad generated on the touch screen display or any other soft input panel (SIP). In various examples, the output elements include the display 205 for showing a GUI, a visual indicator 220 (e.g., a light emitting diode), and/or an audio transducer 225 (e.g., a speaker). In some examples, the mobile computing device 200 incorporates a vibration transducer for providing the user with tactile feedback. In yet another example, the mobile computing device 200 incorporates input and/or output ports, such as an audio input (e.g., a microphone jack), an audio output (e.g., a headphone jack), and a video output (e.g., a HDMI port) for sending signals to or receiving signals from an external device.

FIG. 2B is a block diagram illustrating the architecture of one example of a mobile computing device. That is, the mobile computing device 200 can incorporate a system (i.e., an architecture) 202 to implement some examples. In one examples, the system 202 is implemented as a "smart phone" capable of running one or more applications (e.g., browser, e-mail, calendaring, contact managers, messaging clients, games, and media clients/players). In some examples, the system 202 is integrated as a computing device, such as an integrated personal digital assistant (PDA), tablet and wireless phone.

One or more application programs 266 may be loaded into the memory 262 and run on or in association with the operating system 264. Examples of the application programs include phone dialer programs, e-mail programs, personal information management (PIM) programs, word processing programs, spreadsheet programs, Internet browser programs, messaging programs, and so forth. The system 202 also includes a non-volatile storage area 268 within the memory 262. The non-volatile storage area 268 may be used to store persistent information that should not be lost if the system 202 is powered down. The application programs 266 may use and store information in the non-volatile storage area 268, such as e-mail or other messages used by an e-mail application, and the like. A synchronization application (not shown) also resides on the system 202 and is programmed to interact with a corresponding synchronization application resident on a host computer to keep the information stored in the non-volatile storage area 268 synchronized with corresponding information stored at the host computer. As should be appreciated, other applications may be loaded into the memory 262 and run on the mobile computing device 200 described herein.

The system 202 has a power supply 270, which may be implemented as one or more batteries. The power supply 270 might further include an external power source, such as an AC adapter or a powered docking cradle that supplements or recharges the batteries.

The system 202 may include peripheral device port 230 that performs the function of facilitating connectivity between system 202 and one or more peripheral devices. Transmissions to and from the peripheral device port 230 are conducted under control of the operating system (OS) 264. In other words, communications received by the peripheral device port 230 may be disseminated to the application programs 266 via the operating system 264, and vice versa.

The system 202 may also include a radio interface layer 272 that performs the function of transmitting and receiving radio frequency communications. The radio interface layer 272 facilitates wireless connectivity between the system 202 and the "outside world," via a communications carrier or service provider. Transmissions to and from the radio interface layer 272 are conducted under control of the operating system 264. In other words, communications received by the radio interface layer 272 may be disseminated to the application programs 266 via the operating system 264, and vice versa.

The visual indicator 220 may be used to provide visual notifications, and/or an audio interface 274 may be used for producing audible notifications via the audio transducer 225 (e.g. identified in FIG. 2A). In the illustrated example, the visual indicator 220 is a light emitting diode (LED) and the audio transducer 225 is a speaker. These devices may be directly coupled to the power supply 270 so that when activated, they remain on for a duration dictated by the notification mechanism even though the processor 260 and other components might shut down for conserving battery power. The LED may be programmed to remain on indefinitely until the user takes action to indicate the powered-on status of the device. The audio interface 274 is used to provide audible signals to and receive audible signals from the user. For example, in addition to being coupled to the audio transducer 225, the audio interface 274 may also be coupled to a microphone to receive audible input, such as to facilitate a telephone conversation. In accordance with examples of the present invention, the microphone may also serve as an audio sensor to facilitate control of notifications, as will be described below. The system 202 may further include a video interface 276 that enables an operation of an on-board camera 230 to record still images, video stream, and the like.

A mobile computing device 200 implementing the system 202 may have additional features or functionality. For example, the mobile computing device 200 may also include additional data storage devices (removable and/or non-removable) such as, magnetic disks, optical disks, or tape. Such additional storage is illustrated in FIG. 2B by the non-volatile storage area 268.

Data/information generated or captured by the mobile computing device 200 and stored via the system 202 may be stored locally on the mobile computing device 200, as described above, or the data may be stored on any number of storage media that may be accessed by the device via the radio 272 or via a wired connection between the mobile computing device 200 and a separate computing device associated with the mobile computing device 200, for example, a server computer in a distributed computing network, such as the Internet. As should be appreciated such data/information may be accessed via the mobile computing device 200 via the radio 272 or via a distributed computing network. Similarly, such data/information may be readily transferred between computing devices for storage and use according to well-known data/information transfer and storage means, including electronic mail and collaborative data/information sharing systems.

FIG. 3 is a simplified block diagram of a distributed computing system in which aspects of the present disclosure may be practiced. The system of FIG. 3 may be an exemplary system configured for implementing operations for compliance scanning as described in examples herein. Target data accessed, interacted with, or edited in association with programming modules 108, applications 120, and storage/memory may be stored in different communication channels or other storage types. For example, various documents may be stored using a directory service 322, a web portal 324, a mailbox service 326, an instant messaging store 328, or a social networking site 330, application 128, IO manager 124, other utility 126, and storage systems may use any of these types of systems or the like for enabling data utilization, as described herein. A server 320 may provide storage system for use by a client operating on general computing device 102 and mobile device(s) 200 through network 315. By way of example, network 315 may comprise the Internet or any other type of local or wide area network, and client nodes may be implemented as a computing device 102 embodied in a personal computer, a tablet computing device, and/or by a mobile computing device 200

(e.g., mobile processing device). Any of these examples of the client computing device 102 or 200 may obtain content from the store 316.

Figure 4:
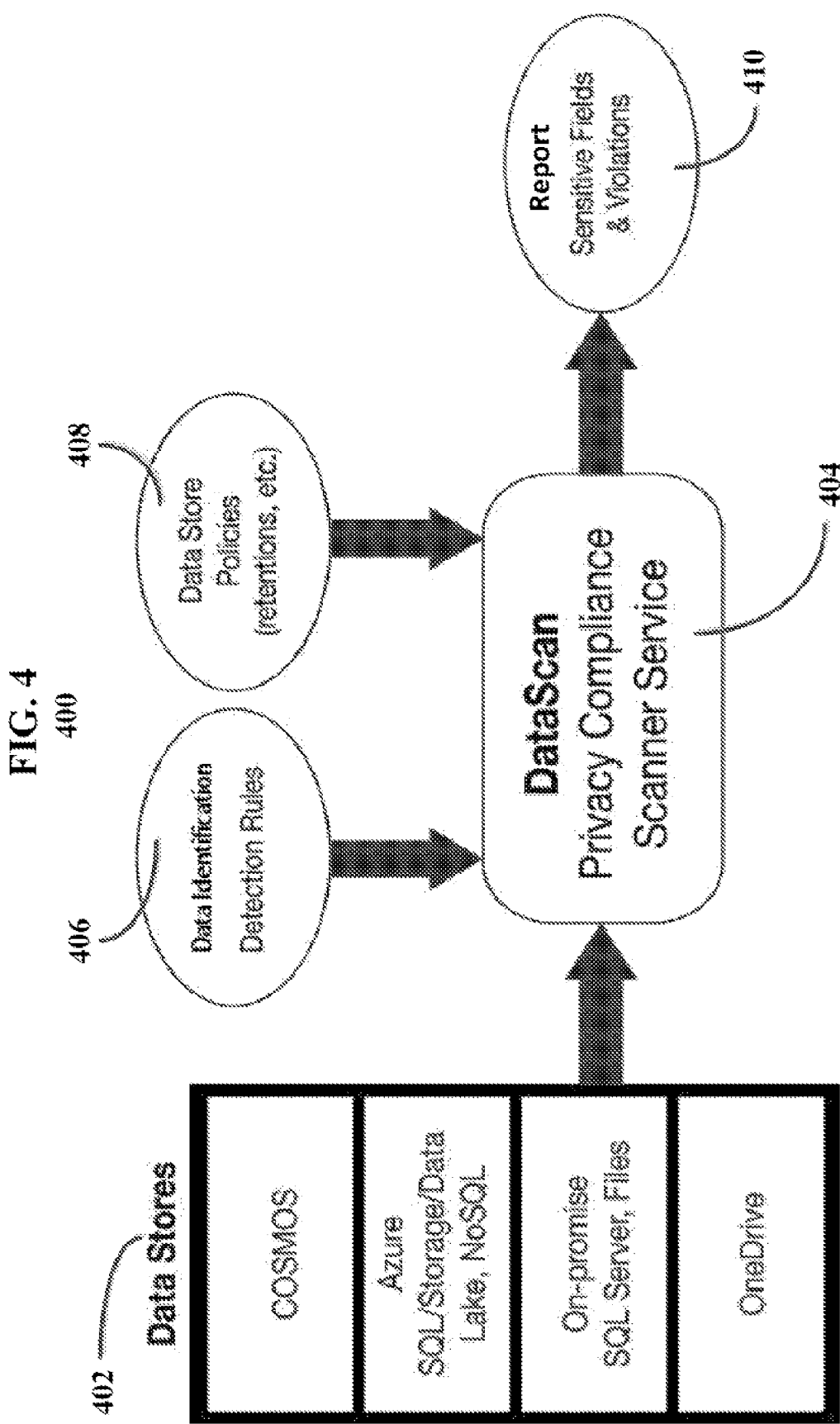
FIG. 4 is an exemplary process flow related to detection of compliance violations in data stores which aspects of the present disclosure may be practiced.

FIG. 4 is an exemplary process flow 400 related to detection of compliance violations in data stores in which aspects of the present disclosure may be practiced. As an example, process flow 400 may be executed by an exemplary processing device and/or system such as those shown in FIGS. 1-3. In examples, process flow 400 may execute on a device comprising at least one processor configured to store and execute operations, programs or instructions. Description of process flow 400 are related to processing operations that may be executed by a system and/or service that execute computer programs, application programming interfaces (APIs), neural networks or machine-learning processing, among other examples. As an example, processing operations related to process flow 400 may be performed by one or more hardware components. In another example, processing operations related to process flow 400 may be performed by one or more software components. In some examples, process flow 400 may be associated with one or more applications and/or a web service that has access to a plurality of application/services, devices, knowledge resources, etc. Process flow 400 is an example of a process flow for implementing operations related to scanning for policy compliance as described in examples herein. FIG. 4 may comprise components including but not limited to: data stores 402, a data scan service 404, a repository for data identification rules 406, a repository for data store policies 408 and report of compliance 410.

Components of process flow 400 interact to enable scanning of data stores 402. Data stored in data stores 402 are an example of network data (described above). A data store (of data stores 402) may be a data container (e.g. file system folder, AZURE BLOB, SQL database, etc.). In some examples, data stores 402 may be one or more storages (e.g., computing devices including server(s), data management systems, etc.) connected over a distributed network. In other examples, data stores 402 may be virtual storage maintained on one or more computing devices of a distributed network. In further examples, data stores 402 may be one or more storages associated with a client computing device. Data stores 402 may store files of network data that may be maintained in any hierarchical arrangement (e.g. folders, subfolders, directories, etc.). Data stores 402 may be associated with any type of technology including but not limited to the examples shown in process flow 400 (e.g. COSMOS, AZURE, ONEDRIVE, etc.).

The data scan service 404 is an exemplary privacy compliance scanning service that may interface with data stores 402 to evaluate network data stored in data stores 402. While examples related to process flow 400 describe data identification and scanning of data that is maintained in data stores 402, a data scan 404 service may be configured to evaluate any type of network data, as described above. The data scan service 404 may execute processing operations related to: the identification of network data, grouping of related data items of network data, data identification of data schemas within specific network data, policy rule identification, scanning of network data for policy compliance, reporting of compliance with policies, and management of compliance violations, among other examples. Examples of processing operations that may be executed by an exemplary data scan service 404 are described in the description of method 500 (of FIG. 5).

In examples, the data scan service 404 may further interface with the repository for data identification rules 406 and the repository for data store policies 408. The repository for data identification rules 406 may maintain information for data identification rules that may be utilized to group and parse data items stored in data stores 402. The data scan service 404 may further utilize the data identification rules in order to identify specific data schemas within specific file data stored in data stores 402. Data identification rules are rules that can be set to apply processing operations to identify structure of a specific instance of network data (e.g. structure of a file). Data identification rules are applied to identify one or more data schemas from file data of a grouping. A data schema as defined herein may relate to a definition of a structure within a file of network data. A file may comprise a plurality of data schemas. As described above, files can be complex (e.g. nested at different levels). Identification of data schemas within a file (of network data) assists in better identifying types of data within a file in order to more efficiently and accurately determine applicable policy rules. The data scan service 404 executes operations such as: discovering network data, grouping of data items (of the network data), and identifying data schema of grouped data items, as described in the description of method 500 (of FIG. 5).

The repository for data store policies 408 may maintain information for policy rules that may be enforceable for data items stored in data stores 402. A policy rule may be any type of rule that may be applicable to data and/or content within a data file. Policy rules may comprise but not limited to: business rules, privacy rules, governmental regulation rules, and legal rules, among other examples. The data scan service 404 may utilize policies rules from the repository for data store policies 408 to scan file data from the data stores 402 in order to determine compliance violations with the policy rules. In doing so, the data scan service 404 executes operations such as: determining applicable policy rules to data schemas for files of network data, utilizing the policy rules to determine whether a file (or portion of the file) is compliant with a policy rule, and reporting of compliance with policies, as described in the description of method 500 (of FIG. 5).

Processing operations executed by the data scan service 404 may generate a report of compliance 410 with the policy rules based on scanning of file data from data stores 402. The report of compliance 410 can be in any file format and may comprise any number and type of data fields tracking results from a scan of file data from the data stores 402. As an example, a report of compliance 410 may comprise data fields including but not limited to: identifying files (or portions of files scanned), identifying compliance violations with policy rules, identifying location of compliance violations in file, identification of a data owner of file, identification of a particular data store, providing remediation action(s) for remedying compliance violation, scrubbing of files due to compliance violations, including links to application/services and/or other resources, In one example, the data scan service 404 may store or maintain a report of compliance 410. In other examples, the data scan service 404 may interface with another component (e.g. compliance management component 610 of FIG. 6) for storage of a report of compliance 410 and/or management of identified compliance violations.

Process flow 400 is repeatable for continuous detection of compliance issues related to stored data. In examples, process flow 400 may be executed by an application/service. In one instance, operations for scanning for compliance violations may occur as background processing during execution of a processing device. Features and/or settings of data scan service 404 may be configurable to vary frequency of scanning, level of scanning, notification of compliance violations, etc.

In an alternative example, an exemplary data scan service 404 may be configured to scan information within an executing application to maintain compliance with policy rules. For instance, a spreadsheet application may be executing where a data column of social security numbers may be entered (and considered as network data defined herein). In such an example, the data scan service 404 may be configured to modify the presentation of such sensitive information in real-time (e.g., show only the last four digits of a social security number) or provide a notification that such information cannot be saved, among other examples.

Figure 5:
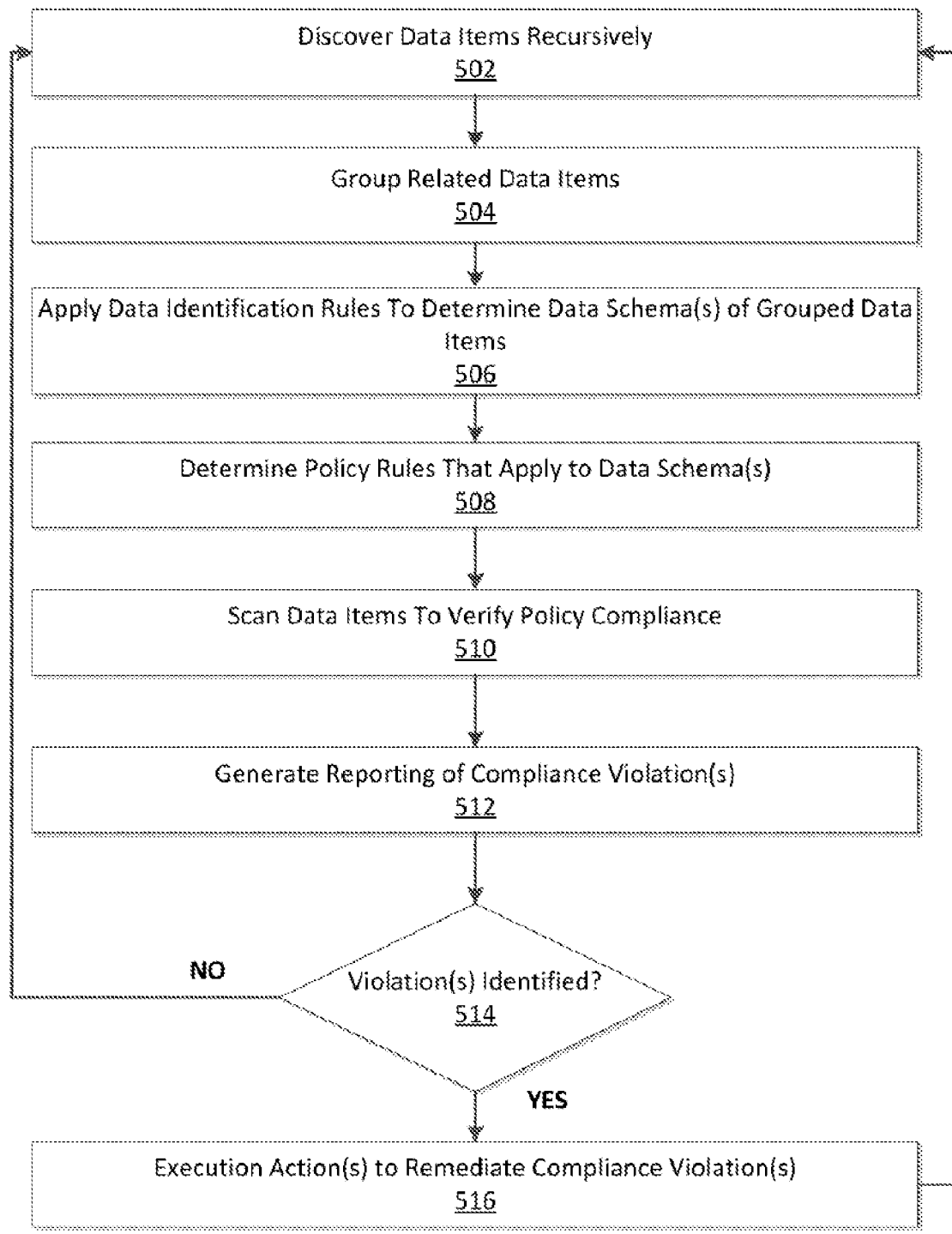
FIG. 5 is an exemplary method related to detection of compliance violations with which aspects of the present disclosure may be practiced.

FIG. 5 is an exemplary method 500 related to detection of compliance violations with which aspects of the present disclosure may be practiced. As an example, method 500 may be executed by an exemplary processing device and/or system such as those shown in FIGS. 1-3. In examples, method 500 may execute on a device comprising at least one processor configured to store and execute operations, programs or instructions. Operations performed in method 500 may correspond to operations executed by a system and/or service that execute computer programs, application programming interfaces (APIs), neural networks or machine-learning processing, among other examples. As an example, processing operations executed in method 500 may be performed by one or more hardware components. In another example, processing operations executed in method 500 may be performed by one or more software components. In some examples, processing operations described in method 500 may be executed by one or more applications/services associated with a web service that has access to a plurality of application/services, devices, knowledge resources, etc.

Method 500 begins at operation 502, where data items are recursively discovered. In one example, data items correspond to network data. Network data may comprise any of: data stored in one or more data stores of a distributed network, data received at a firewall, data stored on a client computing device, and data from an application executing on the client computing device. As an example, an application/service may scan data storages and/or one or more computing devices to discover (operation 502) network data. In one instance, operation 502 may comprise executing scanning/parsing of files in data stores 402 as described in the description of FIG. 4. For instance, an application/service may be executed that discovers what files/tables are in a specific data store. In some examples, only one file (or a few files) may be discovered by operation 502, for example, when a scanning application/service is scanning new file data in real-time (e.g. at a firewall, data being entered into an application or before downloading content to a computing device, etc).

Flow may proceed to operation 504, where related data items of discovered network data are grouped. Processing operations are applied in operation 504 to evaluate network data in order to generate one or more groupings for discovered network data. A grouping may be one or more files of network data. To improve efficiency in scanning of network data (e.g. minimize the amount of data being read during scanning), the network data may be grouped to identify data that includes similar content. In examples, groupings may be based on file type of the network data, among other examples. For instance, a naming convention of a file or the file format may be used to group files. In one instance, a first grouping may be files with a naming convention of (XXX.doc) and a second grouping may be files with a naming convention of (XXX.xml). However, one skilled in the art that understands the present disclosure should recognize that grouping of file data is not limited to grouping of network data by only file type. Other factors may be applicable when grouping data including but not limited to: file name, file size, layout of a file, content within a file, date, file location, and user accounts associated with the file, among other examples.

In one example, grouping of related items may comprise processing operations that extract a pattern for a naming convention of each data item (e.g. file) of network data. Processing operations may further be applied to compare the extracted patterns and group related items into a grouping. A plurality of groupings may be created for different groups of related data items. For each group of data items that have same pattern, processing operations may be applied for sorting the grouped items by date (e.g. creation date, modification date, date of storage, etc.). However, one skilled in the art that understands the present disclosure should recognize that sorting/arranging of grouped data may occur in any number of ways.

At operation 506, data identification rules are applied to determine data schema(s) associated with grouped data items. Data identification rules are rules that can be set to apply processing operations to identify structure of a specific instance of network data (e.g. structure of a file). Data identification rules are applied to identify one or more data schemas from file data of a grouping. A data schema as defined herein may relate to a definition of a structure within a file of network data. A file may comprise a plurality of data schemas. As described above, files can be complex (e.g. nested at different levels). Identification of data schemas within a file (of network data) assists in better identifying types of data within a file in order to more efficiently and accurately determine applicable policy rules.

As an example, operation 506 may comprise parsing file data from a grouping (identified in operation 504). In one instance, a sample of the most recent data item (e.g. file) from a grouping may be determined and used for evaluation of other related data items in a grouping. Sampling may be useful in quickly evaluating data schemas of other related data items in a grouping. The size of the sample may vary, where settings associated with a system or application executing method 500 may be used to adjust a size of a sample. For instance, a top 200 rows of a comma-separated value (CSV) file, or top 10 megabytes (MB) may be used for a sampling. From this sample the tabular schema (a list of columns and content associated with positions in the column) may be produced. In one example, for nested columns that are discovered when parsing (e.g. columns which contain, say, JavaScript Object Notation (JSON) or extensible markup language (XML)), a naming scheme may be similar to: <parent column>.<child column>.<child N column>. In another example, a naming scheme for arrays may be similar to: <parent column>[ ].<child column>.

In alternative examples, each file of a data grouping may be evaluated independently without sampling. Settings can be applied to modify any processing operations described in method 500 depending on the availability of time and network resources during scanning, among other examples.

Once schema is determined (e.g. from the sample), operation 506 may comprise one or more processing operations to read a larger sample of data items from the grouping. Application of data identification rules (operation 506) may comprise determining a position of a data schema in file data of a grouping. One or more files of a grouping may be parsed to determine data schemas of the file. In one example, data schema values are collected, and matched with data identification rules, for example, for each position (e.g. column) in a file. Operation 506 may comprise applying the data identification rules to generate a listing that provides positional information of data schemas within a file. For instance, columns/rows in the file and data schema associated with column/rows may be identified. As an example, different data types may exist in file data, where the different data types may appear in different columns of the same line of a file. For instance, line 1, column 1 may contain a basic text field; line 1, column 2 contains a JSON object, etc. However, one skilled in the art that understands the present disclosure should recognize that a schema of file data is not restricted to just listing of data by column. For example, file data can be arranged in any manner including but not limited to: data type, column, row, page, equations, regular expressions, etc.

Operation 506 may proceed to evaluate the content of identified data schema within a file. For each file, information is generated about which data types were identified in what positions of the file, how many matches occurred, what kind of a match (full/partial/some words), the total confidence for each matching data type, etc. In examples, operation 506 may comprise generating a confidence score for identification of the data schema based on pattern matching that evaluates content of the position in the file data using one or more signals. Signal data may be any data that can be analyzed to aid in the identification of a data schema for pattern matching. Generally, the more signal data that can be confirmed the higher the confidence score. Signal data that may be used for pattern matching includes but is not limited to: evaluation of specific data schemas in a file, evaluation of relationship of a data schema to other data schemas of a file, naming conventions for a data schema, dictionary matching for the data schema and/or content within the data schema, content within a data schema, format of the content, type of file, data owner of a file, patterns for equation matching, patterns for expressions, and statistical classifier analysis, among other examples. In examples, a data scanning application/service may interface with one or more other services of a distributed network to provide access to a variety of resources for analyzing different aspects of a data schema.

Consider an example where a data schema identifies a field as being a phone number, for example, by simply analyzing signal data related to a name of a column (e.g. "phone number"). It may be possible that a naming convention was incorrect or the data within the column is not related to a phone number. If only one signal were analyzed, the confidence score may be lower that the data schema relates to a phone number. However, in some instances, certain signal data is given more weight (e.g. weighting parameters higher). Such factors can be built into modeling to generate a confidence score for data identification of a data schema. Consider another example, where a column is named as "IP Addresses" and a first row entry (second row of column 1) is "255.255.255.0". Examples described herein may apply pattern matching processing using different signals to determine what data is in column 1, row 2. In doing so, a variety of different signals may be analyzed such as: column name, format of content entered into the row (e.g., is it 4 number separated by periods; are the numbers between 0 and 255) etc.) in order to generate a confidence score for identification of content in row 2, column 1 of the file.

Modeling may be applied (factoring in as much signal data as possible) to generate confidence scores. In one example, matches for data types with confidence above a certain threshold are considered "positive" results. In some instances, files (or portions of files) with low confidence scores may be flagged for further review (e.g., manual review at a later point in time).

Flow may proceed to operation 508, where policies that apply to specific data schema(s) may be determined. For instance, processing operations may identify applicable policy rules based on types of data schemas identified within a file. In one example, the repository for data store policies 408 (described in process flow 400 of FIG. 4) may be accessed to retrieve applicable policy rules for scanning files (of network data). In some instance, multiple versions of policy rules may be applicable to documents in a grouping. For instance, policy rules may have changed for documents in a certain date range. At any point during processing of method 500, grouping (described operation 504) may be re-performed to regroup, for example, based on applicable policy rules.

At operation 510, data items are scanned to verify compliance with policy rules. Examples described herein optimize scanning by minimizing the amount of data being read during a scan. As such, a small number of files (or portions of files) can be scanned to identify compliance violations. In examples, not all files of network data (or even all files in a group) are required to be scanned to identify patterns of compliance violations. Further, not all portions of a file may be required to be scanned. In some examples, the scanning may only have to scan a portion of a file that corresponds with a position of a data schema to which a policy rule applies.

By grouping files, samples of file data from a grouping can be scanned. In one example, a most recent file from the file data of a grouping may be scanned to determine compliance with the policy rules. Analyzing a most recent file/version is beneficial because a most recent file relates best to the most current policy rules being enforced. In one instance, scanning of a most recent file may trigger scanning of additional files based on results of the scan of the most recent file. In further examples, at least one other file of the grouping may be scanned, for example, a file that has a date exceeding a time period of a retention policy of a policy rule. For instance, consider the example where a policy rule is that IP addresses should not be retained for search logs that are over 180 days old. A scan may result in the scanning of a most recent search log and a search log that is 181 days old. Subsequent files may be scanned if compliance issues are identified in a sampling of files that are scanned. However, one skilled in the art that understands the present disclosure should recognize that sampling of files, patterns for scanning (including enabling full scans of network data) may vary according to developers and/or users of a scanning service, where 1 to the entirety of files in a grouping may be scanned.

At operation 512, a report is generated for the scanned data. As an example, the report may comprise a listing of any compliance violations identified for files scanned in one or more groupings of network data. As an example, a report may be generated by an application/service such as the data scan service 404 as described in the description of FIG. 4. In examples, one or more reports may be generated for compliance with the policy rules.

At decision operation 514, it is determined whether any policy violations are identified in the report (generated in operation 512). If no compliance violations are identified, flow may branch NO and return back to operation 502, where individual processing devices and/or components of a distributed network are recursively parsed to discover data items for subsequent scanning.

If any policy violations are identified, flow branches YES and proceeds to operation 516 where one or more actions may be executed to remediate identified compliance violations. An executed action may comprise one or more of: requesting a data owner of a file to remedy the compliance violation, scrubbing a file to remedy a compliance violation, and deleting a file that includes the compliance violation, among other examples.

Figure 6:
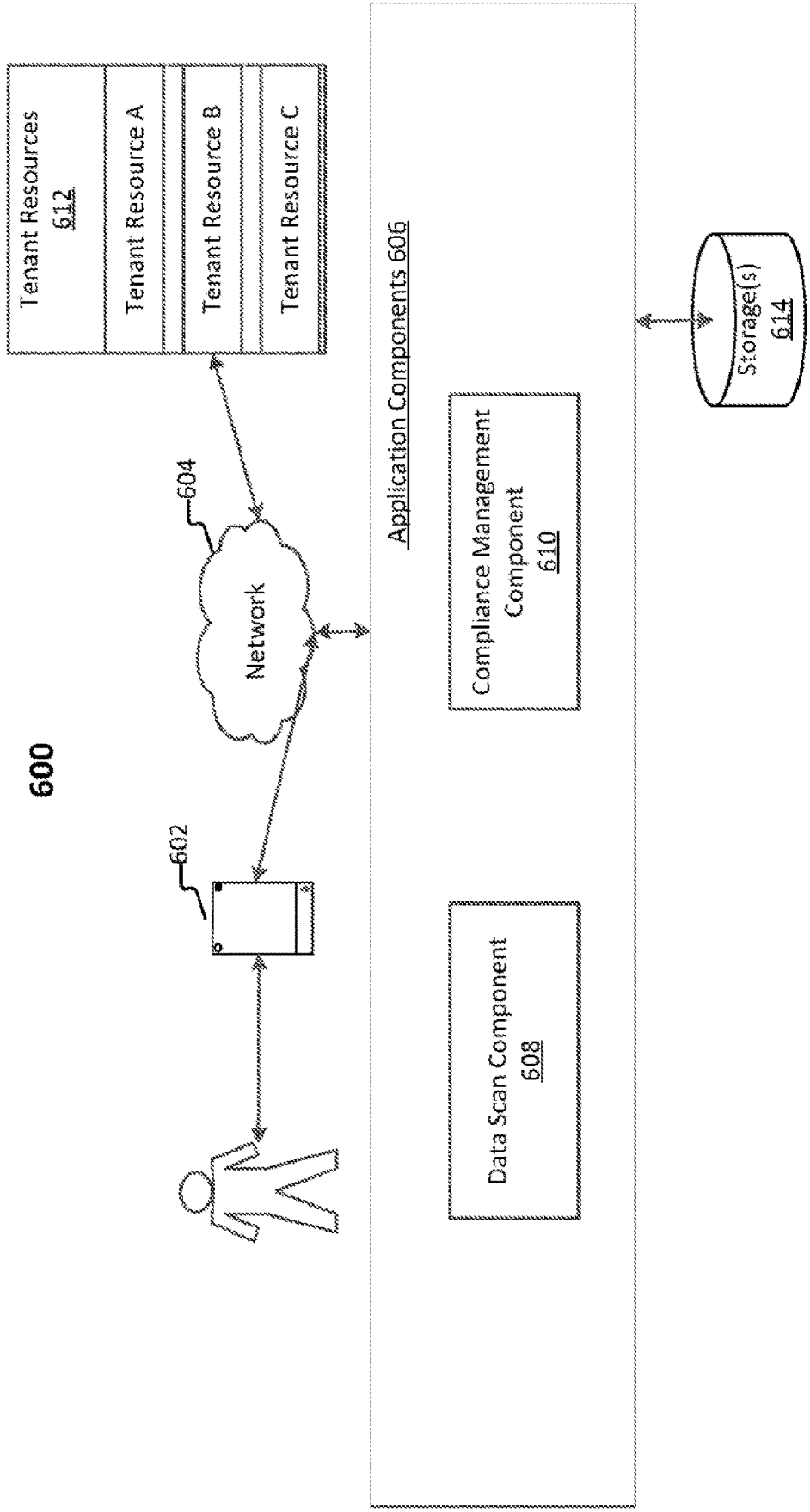
FIG. 6 illustrates an exemplary system implementable on one or more computing devices on which aspects of the present disclosure may be practiced.

FIG. 6 illustrates an exemplary system 600 implementable on one or more computing devices on which aspects of the present disclosure may be practiced. System 600 may be an exemplary system for processing related to management and use of task definitions for task state tracking as described herein. Exemplary system 600 presented is a combination of interdependent components that interact to form an integrated whole for implementing operations for compliance scanning as described in examples herein. Components of system 600 may be hardware components or software implemented on and/or executed by hardware components. In examples, system 600 may include any of hardware components (e.g., ASIC, other devices used to execute/run an OS, and software components (e.g., applications, application programming interfaces, modules, virtual machines, runtime libraries) running on hardware. In one example, an exemplary system 600 may provide an environment for software components to run, obey constraints set for operating, and makes use of resources or facilities of the systems/processing devices, where components may be software (e.g., application, program, module) running on one or more processing devices. For instance, software (e.g., applications, operational instructions, modules) may be executed on a processing device such as a computer, mobile device (e.g., smartphone/phone, tablet) and/or any other type of electronic devices. As an example of a processing device operating environment, refer to operating environments of FIGS. 1-3. In other examples, the components of systems disclosed herein may be spread across multiple devices. For instance, input may be scanned on a client computing device where processing operations may occur through one or more devices in a distributed network such as one or more server devices.

In examples, one or more data stores/storages or other memory are associated with system 600. For example, a component of system 600 may have one or more data storage(s) 614 (described below) associated therewith. Data associated with a component of system 600 may be stored thereon as well as processing operations/instructions executed by a component of system 600. Furthermore, it is presented that application components of system 600 may interface with other application services. Application services may be any resource that may extend functionality of one or more components of system 600. Application services may include but are not limited to: web search services, e-mail applications, calendars, device management services, address book services, informational services, etc.), line-of-business (LOB) management services, customer relationship management (CRM) services, debugging services, accounting services, payroll services, and services and/or websites that are hosted or controlled by third parties, among other examples. Application services may further include other websites and/or applications hosted by third parties such as social media websites; photo sharing websites; video and music streaming websites; search engine websites; sports, news or entertainment websites, and the like. Application services may further provide analytics, data compilation and/or storage service, etc., in association with components of system 600. Exemplary system 600 comprises application components 606 including a data scan component 608 and a compliance management component 610, where each of the identified components may comprise one or more additional components.

System 600 may further comprise one or more storage(s) 614 that may store data associated with operation of one or more components of system 600. In examples, storage(s) 614 may interface with other components of system 600. Data associated with any component of system 600 may be stored in storage(s) 614, where components may be connected to storage(s) 614 over a distributed network including cloud computing platforms and infrastructure services. Exemplary storage(s) 614 may be any of a first-party source, a second-party source, and a third-party source. Storage(s) 614 are any physical or virtual memory space. Data stores 402 (of FIG. 4) are an example of data storage(s) 614.

Storage(s) 614 may store any data for processing operations performed by components of system 600, retained data from processing operations, stored programs, code or application programming interfaces (APIs), training data, links to resources internal and external to system 600 and knowledge data among other examples. Furthermore, in examples, components of system 600 may utilize knowledge data in processing by components of system 600. Knowledge may be used by one or more components of system 600 to improve processing of any of the application components 606 where knowledge data can be obtained from resources internal or external to system 600. In examples, knowledge data may be maintained in storage(s) 614 or retrieved from one or more resources external to system 600 by knowledge fetch operation. In examples (as described below) storage(s) 614 may store exemplary data programs/services and other types of data for: identification of network data, grouping of network data, data identification (and data identification rules/policies), exemplary policy rules, reporting generated from scanning, remediation status for compliance violations, tenant account information, and configuration information, among other examples.

In FIG. 6, processing device 602 may be any device comprising at least one processor and at least one memory/storage. Examples of processing device 602 may include but are not limited to: processing devices such as desktop computers, servers, phones, tablets, phablets, slates, laptops, watches, and any other collection of electrical components such as devices having one or more processors or circuits. In one example processing device 602 may be a device of a user that is executing applications/services. In examples, processing device 602 may communicate with the application components 606 via a network 604. In one aspect, network 604 is a distributed computing network, such as the Internet. Application services may communicate with application components 606 via the network 604. Processing device 602 may be a device as described in the description of FIGS. 1-3. In some examples, processing device 602 may comprise multiple connected devices. Processing device 602 is an example of a user computing device. Processing operations described herein may be executed to scan network data stored on processing device 602 and/or data received through applications/services that is being accessed by processing device 602. Processing device 602 may be further connected with storage(s) 614 via a distributed network. One or more tenant resources 612 (e.g. Tenant Resource A, Tenant Resource B, Tenant Resource C, etc.) may be associated with processing device 602. A tenant resource may be a user account associated with a processing device and/or distributed network service. Data associated with a tenant resource 612 may be stored on storage(s) 614, where a tenant account can be utilized to access stored data by processing device 602 and/or other processing devices.

The application components 606 are a collection of components configured for implementing data scanning and compliance management with policy rules. Application components 606 may comprise a data scan component 608 and a compliance management component 610. The data scan component 608 is a component that implements processing operations described in the descriptions of process flow 400 (FIG. 4) and method 500 (FIG. 5). As an example, the data scan component 608 executes processing operations related to discovering network data, grouping related data items, applying data identification rules, scanning data items, and generating a reporting of compliance violations. In some examples, the data scan component 608 may be further configured to remediate identified compliance violations. However, in other example, the data scan component 608 interfaces with the compliance management component 610, which handles execution of actions related to management of an identified compliance violation.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
generating by a processing device one or more groupings for a network data based on file type of the network data;
applying by the processing device data identification rules to identify at least one data schema of the one or more groupings of network data to provide more efficient operation of the processing device;
determining by the processing device one or more policy rules that apply to content of the at least one data schema, the policy rules being determined at least in part based on the data schema;
scanning by the processing device at least one file from the file data of the one or more groupings to determine compliance with the one or more policy rules; and
generating by the processing device, for the at least one file scanned, a report of compliance with the one or more policy rules.

2. The method of claim 1, further comprising recursively discovering the network data, wherein the network data is one or more selected from a group consisting of: data stored in one or more data stores of a distributed network, data received at a firewall, data stored on a client computing device, and data from an application executing on the client computing device.

3. The method of claim 1, wherein the scanning further comprises scanning a most recent file from the file data of the one or more groupings to determine compliance with the policy rules.

4. The method of claim 3, wherein the scanning further comprises scanning at least one file of the file data that has a date that exceeds a retention policy for a policy rule that is applicable to the at least one schema.

5. The method of claim 1, wherein the applying data identification rules further comprises determining a position of at least one schema in the file data of the one or more groupings.

6. The method of claim 1, wherein the applying of the data identification rules further comprises generating a confidence score for identification of the at least one data structure based on pattern matching that evaluates content of the position in the one or more files of network data.

7. The method of claim 5, wherein the scanning further comprises scanning, for the one or more groupings, a portion of the at least one file that corresponds with the position of the at least one data schema to which a policy rule applies.

8. The method of claim 1, further comprising executing at least one action to remediate a compliance violation identified in the reporting, wherein the at least one action is one or more selected from a group consisting of: requesting a data owner of the at least one file to remedy the compliance violation, scrubbing the at least one file to remedy the one or more compliance violations, and deleting the at least one file that includes the compliance violation.

* * * * *